United States Patent
Volkmar

(10) Patent No.: US 11,034,339 B2
(45) Date of Patent: Jun. 15, 2021

(54) METHOD FOR DIAGNOSTICS ON A BRAKING SYSTEM OF A MOTOR VEHICLE, AND CORRESPONDING BRAKING SYSTEM

(71) Applicant: AUDI AG, Ingolstadt (DE)

(72) Inventor: Kai Volkmar, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 110 days.

(21) Appl. No.: 16/487,944

(22) PCT Filed: Jan. 24, 2018

(86) PCT No.: PCT/EP2018/051716
§ 371 (c)(1),
(2) Date: Aug. 22, 2019

(87) PCT Pub. No.: WO2018/153607
PCT Pub. Date: Aug. 30, 2018

(65) Prior Publication Data
US 2020/0039479 A1    Feb. 6, 2020

(30) Foreign Application Priority Data

Feb. 22, 2017   (DE) ............... 10 2017 202 813.0

(51) Int. Cl.
*B60T 17/22*   (2006.01)
*B60T 1/06*   (2006.01)
(Continued)

(52) U.S. Cl.
CPC .............. *B60T 1/065* (2013.01); *B60T 1/067* (2013.01); *B60T 13/748* (2013.01); *B60T 17/221* (2013.01);
(Continued)

(58) Field of Classification Search
CPC .. B60T 17/221; B60T 17/222; B60T 2201/12; B60T 2270/406
See application file for complete search history.

(56) References Cited

U.S. PATENT DOCUMENTS 2,485,086 A * 10/1949 Cagle ...................... F16D 55/32
                                                              188/370
3,991,860 A * 11/1976 Clemmons .............. F16D 55/40
                                                              188/73.32
(Continued)

FOREIGN PATENT DOCUMENTS

CN          1755158 A       4/2006
CN        103328286 A       9/2013
(Continued)

OTHER PUBLICATIONS

English-translation of International Preliminary Report on Patentability dated Sep. 6, 2019 in corresponding International Application No. PCT/EP2018/051716; 9 pages.
(Continued)

*Primary Examiner* — Thomas J Williams
(74) *Attorney, Agent, or Firm* — Maier & Maier, PLLC

(57) ABSTRACT

A method for operating a brake system for a motor vehicle, wherein the brake system has a braking pressure source and at least one wheel brake which can be pressurized with a braking pressure which is provided by means of the braking pressure source and acting on a brake piston. For performing a diagnosis of the brake system, the wheel brake is pressurized with a braking pressure which corresponds to a diagnosis braking pressure and which applies a certain force on the brake piston, and a counterforce directed oppositely to said force is applied to the brake piston.

10 Claims, 2 Drawing Sheets

(51) Int. Cl.
  *B60T 13/74* (2006.01)
  *F16D 49/00* (2006.01)
(52) U.S. Cl.
  CPC ..... *B60T 2201/12* (2013.01); *B60T 2270/406* (2013.01); *F16D 49/00* (2013.01)

(56) References Cited

U.S. PATENT DOCUMENTS

| | | | |
|---|---|---|---|
| 5,348,123 A | | 9/1994 | Takahashi et al. |
| 5,613,577 A | | 3/1997 | Collin |
| 5,788,022 A | | 8/1998 | Antony |
| 5,927,445 A | | 7/1999 | Bieker et al. |
| 6,213,253 B1 | * | 4/2001 | Paul ................. B60T 17/221 188/1.11 W |
| 6,481,805 B1 | * | 11/2002 | Ichinose ............. B60T 7/042 188/72.3 |
| 8,444,231 B2 | * | 5/2013 | Ishii ................. B60T 5/00 303/191 |
| 2010/0090058 A1 | * | 4/2010 | Cahill ................. B64F 5/60 244/111 |
| 2010/0174464 A1 | * | 7/2010 | Teyssier ............. B60T 17/22 701/70 |
| 2016/0311422 A1 | * | 10/2016 | van Zanten .......... B60T 8/4081 |

FOREIGN PATENT DOCUMENTS

| | | |
|---|---|---|
| DE | 3435089 A1 | 4/1986 |
| DE | 19510933 A1 | 9/1996 |
| DE | 10224971 A1 | 12/2003 |
| DE | 69813482 T2 | 2/2004 |
| DE | 102006049794 A1 | 5/2007 |
| DE | 102008020566 A1 | 10/2009 |
| DE | 102008034769 A1 | 1/2010 |
| DE | 112012005188 T5 | 9/2014 |
| EP | 1 369 326 A1 | 12/2003 |
| EP | 2671769 A1 | 12/2013 |
| WO | 2009/083216 A2 | 7/2009 |

OTHER PUBLICATIONS

German Search Report dated Jul. 2, 2018 in corresponding German Application No. 10 2017 202 813.0; 24 pages.
International Search Report and Written Opinion dated May 14, 2018 in corresponding International Application No. PCT/EP2018/051716; 26 pages.
Chinese Office Action dated Jan. 4, 2021, in connection with corresponding CN Application No. 201880013270.2 (22 pp., including machine-generated English translation).

* cited by examiner

METHOD FOR DIAGNOSTICS ON A BRAKING SYSTEM OF A MOTOR VEHICLE, AND CORRESPONDING BRAKING SYSTEM

FIELD

The invention relates to a method for operating a brake system for a motor vehicle, wherein the brake system has a braking pressure source and at least one wheel brake, which can be pressurized with a braking pressure which is provided by means of the braking pressure source and acting on a brake piston. The invention further relates to a brake system for a motor vehicle.

BACKGROUND

The brake system is used to decelerate the motor vehicle, insofar to provide a braking force acting on a wheel of the motor vehicle. The braking force can be imparted to the at least one wheel by means of the wheel brake. If the motor vehicle has more than said one wheel, that is at least two wheels, then the brake system preferably has a wheel brake for a plurality of said wheels or all the wheels, by means of which the braking force can be imparted to the corresponding wheel. In the following, only the at least one wheel brake will be discussed. The realizations are transferrable to several wheel brakes—if provided. For example, in the actuation of an operating element an actual braking pressure is applied to the wheel brake. In this regard the brake system is a service brake of the motor vehicle or forms at least one component of the service brake.

The brake system has, for example, a main brake cylinder in which a main brake piston is displaceably arranged. The main brake piston delimits, together with the main brake cylinder, a brake fluid volume which is variable, and its size is dependent on the position of the main brake piston. The main brake piston is connected to an operating element which is present, for example, as a brake pedal. A driver of the motor vehicle can set a desired braking force via the operating element which braking force is subsequently designated as a default braking force and which is preferably in a fixed relationship with a default braking pressure. Of course, the main brake cylinder can also be omitted and the default braking force or the default braking pressure can be set solely by means of the operating element.

The brake system is preferably present as an electro-hydraulic brake system. This means that in at least one mode of operation of the brake system the brake fluid present in the brake fluid volume is not provided directly to the actual braking pressure applied to the wheel brake upon the actuation of the operating element or only a part thereof is provided, if necessary. Rather, it is provided to determine a target braking pressure upon actuation of the operating element, which may be provided by means of at least one sensor, which is associated with the operating element and/or the main brake piston and/or the main brake cylinder and/or a simulator cylinder, in which a simulator piston is displaceably arranged.

The sensor can, for example, be configured as a position sensor or pressure sensor. In the former case, by means of the sensor, the operating distance of the operating element is determined by which the operating element is displaced during its actuation. Additionally or alternatively, the pressure present in the main brake cylinder can be determined by means of the sensor, of course. From the parameters measured by means of the sensor such as, for example, the travel and/or the pressure, then the target braking pressure is determined. Subsequently, an actual braking pressure is applied or set at the wheel brake, which corresponds the target braking pressure.

In this case the actual braking pressure is provided by the braking pressure source, which, for example, is present in the form of a pump, in particular an electrically operated pump. In the above-described mode of operation of the brake system, the brake fluid volume is not or at least not directly connected or fluidly connected to the wheel brake. In order to provide a fallback level in the event of a defect in the brake system, for example if the braking pressure source fails, there is preferably a direct flow connection between the main brake cylinder and the wheel brake. In this manner, even in the event of a defect of the brake system, an actual braking pressure can be built up at the wheel brake upon actuation of the operating element. To this end, however, the driver has to apply a much larger operating force to the operating element as usual.

SUMMARY

It is an object of the invention to provide a method for operating a brake system for a motor vehicle, which, compared to known methods, has advantages, in particular allows reliable operation of the brake system independently of the drive system.

It is provided that for performing a diagnosis of the brake system, the wheel brake is pressurized with a braking pressure which corresponds to a diagnosis braking pressure and which applies a certain force on the brake piston, and a counterforce directed oppositely to said force is applied to the brake piston, so that buildup of a braking force at the wheel brake is inhibited, in particular a brake shoe associated with the brake piston remains spaced apart from of a brake disc or a brake drum of the wheel brake.

The wheel brake has the brake piston, which is arranged preferably displaceably, in particular linearly displaceably in a brake cylinder. By means of the brake piston a force generated by the application of brake fluid to the wheel brake can be imparted to a brake shoe of the wheel brake, wherein the brake shoe, in particular, is a brake lining.

Especially with the introduction of recuperation-capable drive devices for motor vehicles, in which a portion of the motion energy of the motor vehicle during the braking process is transferred into a storable form of energy, such as electric energy, so-called blending-capable brake systems are becoming increasingly more important. These systems can vary the braking pressure or actual braking pressure which is applied to the wheel brake, independently of the default braking force requested by the driver, and in particular set an actual braking force which is smaller than the default braking force. The difference between the actual braking force and the default braking force at the wheel brake is effected by recuperation using the drive device.

An energetically particularly advantageous range of operation of such a motor vehicle is the one in which the deceleration of the motor vehicle is completely realized through the action of drive-train torque. For this purpose, the braking pressure acting on the wheel brake must be at least almost or equal to zero, so that no braking torque or braking force is generated by the wheel brake. Depending on the design of the drive train, in particular depending on the installed recuperation performance, the deceleration range covered and represented purely recuperatively can be so large that the majority or all of the deceleration processes within a driving cycle can be represented in this way.

Due to its fundamental importance to driving safety highest demands in terms of its reliability are placed on the service brake of the motor vehicle. Conventional brake systems meet these demands by operationally proven construction and design and in addition offer, by repeated operation, the ability to recognized functional restrictions relatively early and from a statistics viewpoint, low-risk driving situations. An important cause of failure are leaks of the hydraulic system that lead to loss of brake fluid and/or the inability to build up hydraulic pressure.

The effects mentioned can be detected automatically (for example by fill level measurement in the reservoir and activation of a warning lamp in the event of fallen short of a minimum level) or by involvement of the driver (evaluation of the brake pedal travel and/or the operating force). The redundant design of the brake circuits and, in most cases, only gradually increasing effects of these failures realizes a high reliability of the brake system.

The diagnosis of the brake system is used to determine its functionality. As part of the diagnosis it is determined in this respect, whether, by means of the wheel brake, said specific force can be effected on the brake piston or whether this is not possible, in particular due to leaks. The wheel brake has the brake disc or the brake drum in addition to the brake piston and the brake shoe or the brake lining.

The brake disc is configured as a disc brake and the brake drum is configured as a drum brake. Of course, other brakes can be realized as well. In this case it is always important that the build-up of the braking force on the wheel brake is prevented, that is to say no or at least only a negligible braking force acts on the wheel, which is associated with the wheel brake.

During a braking process of the motor vehicle by means of the wheel brake the brake shoe or the brake lining is forced in the direction of the brake disc/brake drum or on to the brake disc/brake drum by the brake piston, so that a frictional contact between the brake shoe or the brake lining and the brake disc or the brake drum occurs.

However, performing the diagnosis will now take place such that no braking force will be imparted to the corresponding brake by means of the wheel brake. This means that it must be prevented during diagnosis that the brake shoe or the brake lining comes into contact with the brake disc or the brake drum. Accordingly, the wheel brake is pressurized with the braking pressure which corresponds to the diagnostic braking pressure, at the same time, however, the counterforce is applied to the brake piston.

The counterforce is directed opposite to the force, but has the same magnitude in at least one position of the brake piston, so that at a constant braking pressure the brake piston also retains its position. Accordingly, an operative contact between brake shoe or brake lining and brake disc is prevented even when braking pressure is present at the wheel brake, namely by choosing and applying the counterforce so that the brake shoe or the brake lining remains spaced apart from the brake disc or the brake drum.

It is particularly preferably provided that the diagnosis is carried out when the wheel brake is not actuated by a driver of the motor vehicle. Hereinbefore it has been explained that the driver of the motor vehicle usually actuates the wheel brake by actuating the operating element, wherein particularly preferably, the default braking force or the corresponding default braking pressure is determined by means of a sensor. It is provided for the diagnosis of the brake system to take place when the default braking force is below a certain threshold, in particular equal to zero. The braking pressure applied to the wheel brake for performing the diagnosis or the diagnosis braking pressure is provided in this respect by means of the braking pressure source preferably configured in this case as a pump.

A further development of the invention provides for the brake piston to be fixed for applying the counterforce by means of a blocking device. Basically, the blocking device can be configured arbitrarily, as long as it fixes the brake piston in a certain position in which the brake shoe or the brake lining is spaced apart from the brake disc or the brake drum. The blocking device may be present as an adjusting bolt, which fixes the brake piston in a first position, and releases it in a second position for displacement.

A particularly preferred embodiment of the invention provides for the wheel brake to have a clearance which is limited by a first clearance position and a second clearance position by brake shoe or the brake lining being displaceable in the direction of the brake disc or the brake drum while maintaining a distance, and that a force can be applied to the brake piston by means of a restoring device so that the counterforce between the first clearance position and the second clearance position is set to a force required for fixing the brake piston. The clearance is understood to mean a distance between the brake shoe or the brake lining from the brake disc or the brake drum which is present in the case of a non-actuated wheel brake.

The first clearance position can for example correspond to a rest position of the brake piston or the brake shoe or the brake lining, which is present when the wheel brake is not actuated. Alternatively, the first clearance position can also be present spaced apart from this initial position and thus be arranged between the initial position and the second clearance position.

The second clearance position is, for example, a position in which the brake shoe or the brake lining is just far enough away from the brake disc, so that there is no contact between them. Thus, in the second clearance position there is a much smaller distance between the brake shoe or the brake pad and the brake disc or the brake drum than in the first clearance position. Within the clearance the brake shoe or the brake lining can be displaced while retaining the distance in the direction of the brake disk or the brake drum. Accordingly, within the clearance the brake shoe or the brake lining is present spaced apart from the brake disc or the brake drum.

The brake system or the wheel brake now has the restoring device, which causes a spring force on the brake piston. The spring force generated by means of the restoring device corresponds to the counterforce, which is directed oppositely to the force caused by the braking pressure. In this case the counterforce is chosen such that it fixes the brake piston between the first clearance position and the second clearance position, i.e. that the brake piston is displaced from its initial position and toward the second clearance position. Particularly preferably, the counterforce is chosen such that the brake piston is fixed between the first clearance position and the second clearance position or alternatively in the second clearance position.

A further preferred embodiment of the invention provides for the counterforce between the first clearance position and the second clearance position, in particular starting from the first clearance position and/or up to the second clearance position, is set to be increasing. Particularly preferably, the counterforce increases according to a certain course on the distance between the first clearance position and the second clearance position. The course can be linear, for example. Especially it is provided for the counterforce to be increasing continuously over the distance toward the second clearance position, in particular steadily or continually. The increase in counterforce begins, for example, in the first clearance position and/or ends in the second clearance position.

A further development of the invention provides for the counterforce is set continuously increasing, in particular increasing according to a certain course. This has been pointed out above. The continuously increasing of the counterforce is understood to mean that the counterforce does not decreases across the clearance in the direction of the second clearance, but always increases. For this purpose, in particular, the particular course across the distance is taken into account.

A particularly preferred further embodiment of the invention provides for the counterforce to be set to be increasing in the clearance or via the clearance by at least 25%, at least 50%, at least 75% or at least 100%. For example, therefore, in a first position of the brake piston there is a first counterforce and in a second position there is a second counterforce. In this case, the first position is closer to the first clearance position than the second position or vice versa, the second position is closer to the second clearance position than to the first clearance position. It can be provided for the first position to correspond to the first clearance position and/or the second position to correspond to the second clearance position. The second counterforce is now greater than the first counterforce, in particular by the stated values.

A further development of the invention provides for an automatic braking pressure source to be used as the braking pressure source. The automatic braking pressure source is, for example, a pump or the like. The braking pressure source is controlled to perform the diagnosis by means of a controller for generating the braking pressure, in particular wherein the controller is also provided for performing the diagnosis.

Finally, it can be provided in the context of a further preferred embodiment of the invention for a brake fluid volume supplied to the wheel brake to be determined during the diagnosis. In such a manner the functionality of the wheel brake can be determined particularly reliably. To actuate the wheel brake and to perform the diagnosis it is provided for brake fluid to be supplied to the wheel brake by means of the braking pressure source. For example, this brake fluid is taken prior from a reservoir.

Preferably, the brake fluid volume supplied to the wheel brake during the diagnosis is determined by means of a mass flow measuring apparatus whose measurement values are collected and summed or integrated over time. Then, the position of the brake piston is determined from the brake fluid volume determined, which should be present due to the brake fluid volume supplied to the wheel brake. In addition, for example, the actual position of the brake piston is determined. If the two position do not match a defect of the wheel brake and/or of the brake system may be assumed. Instead of the mass flow measuring apparatus, a volume flow measuring device may be used.

Alternatively or additionally, it is of course possible to determine the brake fluid volume in other ways. For example, for this purpose, the piston position of a pump can be used, which is determined either directly by means of a sensor or indirectly by means of a model. Even when using a continuously or quasi-continuously operating pump, for example a radial piston or gear pump, the mass flow or the volume flow may be determined by calculation, and integrated or summed from the characteristics and the operation of the pump.

The invention further relates to a brake system for a motor vehicle, especially for performing the method described above, wherein the brake system has a braking pressure source and at least one wheel brake which can be pressurized by a braking pressure provided by the braking pressure source and acting on a brake piston.

In this case, it is provided for the brake system to be designed for performing a diagnosis of the brake system, the wheel brake to be pressurized with a braking pressure corresponding to a diagnosis braking pressure and causing a certain force on the brake piston, and a counterforce directed oppositely to said force to be applied to the brake piston so that the buildup of a braking force at the wheel brake is inhibited, in particular a brake shoe associated with the brake piston remains spaced apart from of a brake disc or a brake drum.

The advantages of such a configuration of the brake system or such an approach has already been pointed out. Both the brake system for the motor vehicle and the method for its operation can be developed further according to the above statements, so that reference is made to these remarks. As already explained above, it can be provided for the brake system to be configured in such a way that it determines, in particular directly or indirectly, a brake fluid volume supplied to the wheel brake during the diagnosis.

In the context of a further embodiment of the invention it finally can be provided for the wheel brake to have a clearance which is limited by a first clearance position and a second clearance position by the brake shoe or the brake lining being displaceable in the direction of the brake disc or the brake drum while maintaining a distance, and for a force to be applicable to the brake piston by means of a restoring device, the restoring device being designed so that the counterforce between the first clearance position and the second clearance position corresponds to a force required for fixing the brake piston. Again, reference is made to the above statements.

BRIEF DESCRIPTION OF THE FIGURES

The invention will be explained in more detail below with reference to the exemplary embodiments illustrated in the drawings, without any limitation of the invention.

DETAILED DESCRIPTION

Figure 1:
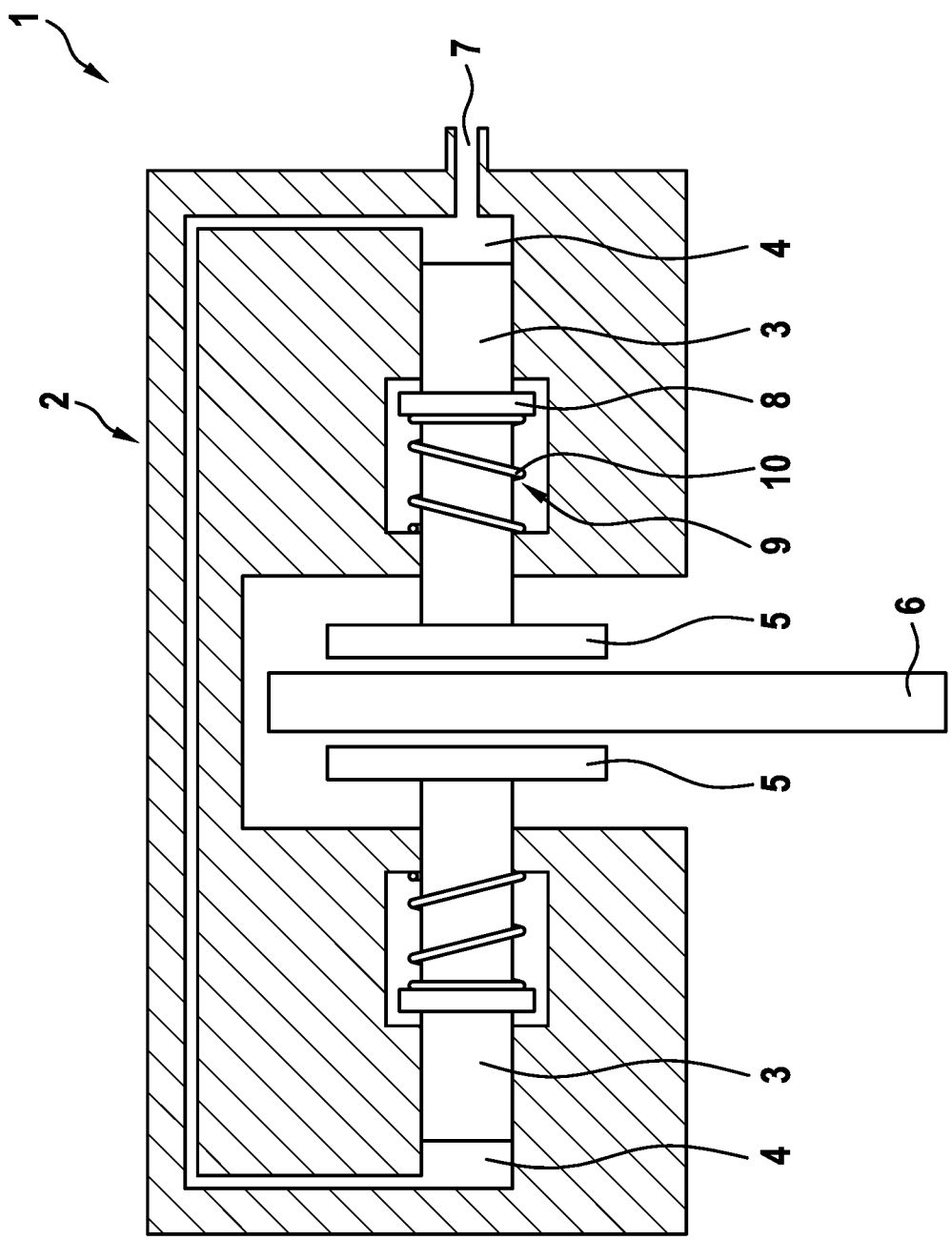
FIG. 1 shows a schematic representation of an area of a brake system for a motor vehicle, namely an area of a wheel brake.

FIG. 1 shows a schematic representation of an area of a brake system 1, which is an area of a wheel brake 2. Wheel brake 2 has at least one brake piston 3, which is linearly displaceably arranged in a brake cylinder 4. The brake piston 3 is associated with a brake shoe 5, which can come into abutting contact with a brake disk 6 for effecting a braking force. Brake shoe 5 preferably has a brake lining on its side facing brake disc 6. In the exemplary embodiment presented, wheel brake 2 is a disc brake. However, of course, a configuration as a drum brake or the like is also possible.

In the exemplary embodiment illustrated herein, two opposite brake pistons 3, and accordingly two brake linings 5 oppositely arranged with respect to brake disc 6 are provided. Both brake cylinders 4 are connected to other areas of brake system 1 via a common fluid line 7, in particular to a braking pressure source. In the following, merely one of brake pistons 3 and accordingly merely one of brake linings 5 will be addressed. However, the statements can be applied in any case analogously to the other brake piston 3, the other brake shoe 5.

It can be clearly seen that a stop element 8 is formed on brake piston 3, which is present, for example, in the form of a radial projection which is configured, in particular, as an annular projection. Stop element 8 may be provided on the one hand to realize an end stop. On the other hand, a restoring device 9 engages the stop element 8, which has—as shown herein—at least one spring element 10. The restoring device 9 applies a counterforce to brake piston 3 which counterforce is directed opposite to a force generated upon application of a braking pressure to the wheel brake 2. This force forces brake piston 3 or brake shoe 5 in the direction of brake disk 6. Accordingly, the counterforce is directed in the opposite direction and forces brake piston 3 and brake shoe 5 away from brake disc 6.

It is now provided for performing a diagnosis of brake system 1 for wheel brake 2 to be pressurized with a braking pressure corresponding to a diagnosis braking pressure. This diagnosis braking pressure causes the particular force to brake piston 3. The counterforce caused by means of restoring device 9 is now designed in such a way that brake shoe 5 remains spaced apart from brake disc 6 in the presence of the diagnosis braking pressure. However, if the braking pressure exceeds the diagnosis braking pressure, then the force caused by the braking pressure can overcome the counterforce, so that finally brake shoe 5 can come or comes into operative contact with brake disc 6, so that by means of the wheel brake 2 a certain braking force is effected to brake disk 6.

Figure 2:
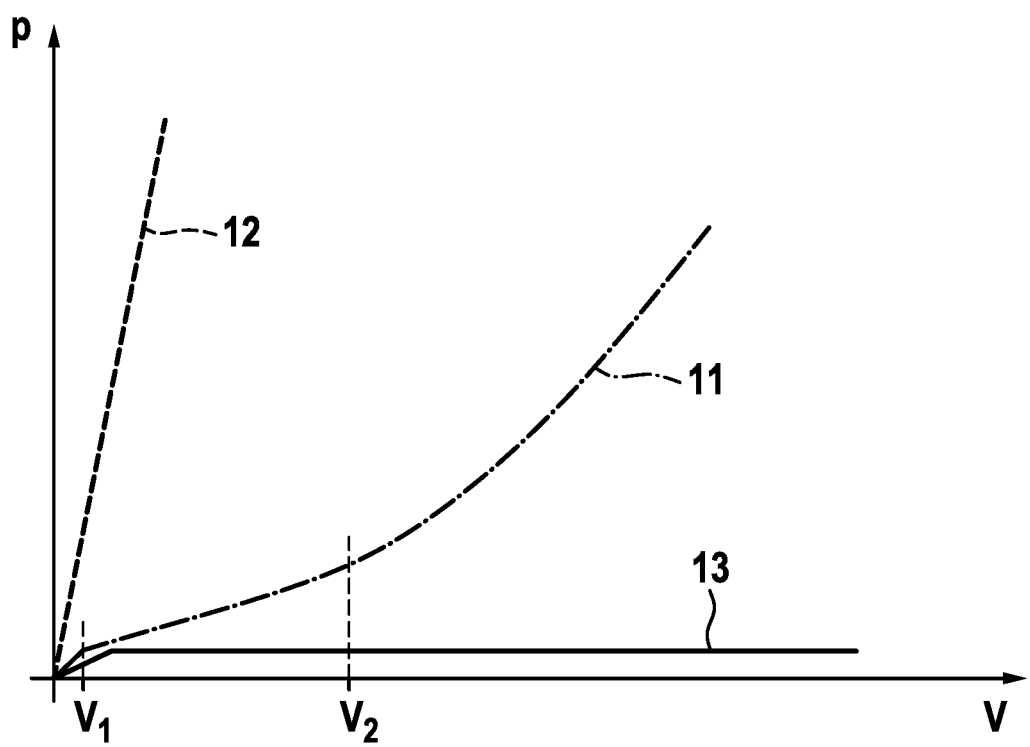
FIG. 2 shows a diagram in which different characteristics for a braking pressure of the wheel brake are plotted over a brake fluid volume supplied to the wheel brake.

FIG. 2 shows a diagram in which three courses for a braking pressure p over a brake fluid volume V are presented. The courses are identified by reference numerals 11, 12 and 13. It should be noted that courses 11, 12 and 13 are provided for a brake system 1, which is configured for performing the diagnosis. Course 11 describes a characteristic curve of wheel brake 2 in a functional state. It can be seen that up to a volume of $V=V_1$, the braking pressure p initially increases more strongly than in the case with infinitesimally larger brake fluid volume V. For a volume of $V_1<V\le V_2$, the so-called clearance is present. In said clearance the braking pressure p increases substantially linearly over brake fluid volume V.

The clearance includes positions in which brake shoe 5 does not yet come in contact with brake disc 6. This is only the case starting at volume $V=V_2$. It can be seen that for $V>V_2$ the braking pressure p is no longer linear over the brake fluid volume V, but rather increases disproportionately. Starting at the volume $V=V_2$, a braking force is effected by means of wheel brake 2. The diagnosis of brake system 1 can now be carried out in an area between brake fluid volume $V_1$ and $V_2$. In this area, a breakaway torque of wheel brake 2 is already overcome, whereas on the other hand, brake shoe 5 does not yet abut brake disc 6.

Courses 12 and 13 show characteristics of wheel brake 2 when different defects occur. While course 12 indicates the characteristic in a hydraulic or mechanical blockage purely by way of example, course 13 shows the characteristic in the case of a hydraulic leak. It becomes clear that in the event of course 12 of the braking pressure p increases sharply over fluid volume V, whereas this is not the case for course 13.

With the described configuration of brake system 1 or with the aid of the procedure explained above, a reliable diagnosis of brake system 1 can be carried out in a simple manner. In this case, the diagnosis can be performed fully automatically without the need for a driver of the motor vehicle to intervene, for example by actuating an operating element, in particular a brake pedal.

The invention claimed is:

1. A method for operating a brake system for a motor vehicle, wherein the brake system comprises:
   at least one wheel brake comprising at least a braking pressure source configured to pressurize a braking pressure which is provided by the braking pressure source and acts on a brake piston,
   wherein, for performing a diagnosis of the brake system, the wheel brake is pressurized with a predetermined braking pressure which corresponds to a diagnosis braking pressure and which applies a predetermined force on the brake piston, and a counterforce directed oppositely to said force is applied to the brake piston, so that buildup of a braking force at the wheel brake is inhibited, in particular a brake shoe associated with the brake piston remains spaced apart from a brake disc or a brake drum of the wheel brake.

2. The method according to claim 1, wherein the brake piston is fixed for applying the counterforce by a blocking device.

3. The method according to claim 1, wherein the wheel brake has a clearance which is limited by a first clearance position and a second clearance position by brake shoe being displaceable in the direction of the brake disc or the brake drum while maintaining a distance, and that a force can be applied to the brake piston by a restoring device so that the counterforce between the first clearance position and the second clearance position is set to a force required for fixing the brake piston.

4. The method according to claim 1, wherein the counterforce between the first clearance position and the second clearance position, in particular starting from the first clearance position and/or up to the second clearance position, is set to be increasing.

5. The method according to claim 1, wherein the counterforce is set continuously increasing, in particular increasing according to a certain course.

6. The method according to claim 1, wherein the counterforce in a clearance or via the clearance is set to be increasing by at least 25%, at least 50%, at least 75% or at least 100%.

7. The method according to claim 1, wherein an automatic braking pressure source is used as the braking pressure source.

8. The method according to claim 1, wherein a brake fluid volume supplied to the wheel brake is determined during the diagnosis.

9. A brake system for a motor vehicle, comprising:
   at least one wheel brake comprising at least a braking pressure source which can be pressurized with a braking pressure which is provided by the braking pressure source and acting on a brake piston, wherein, for performing a diagnosis of the brake system, the brake system is designed to pressurize the wheel brake with a predetermined braking pressure which corresponds to a diagnosis braking pressure and which applies a predetermined force on the brake piston, and to apply a counterforce directed oppositely to said force to the brake piston, so that buildup of a braking force at the wheel brake is inhibited, in particular a brake shoe associated with the brake piston remains spaced apart from of a brake disc or a brake drum.

10. The brake system according to claim 9, wherein the wheel brake has a clearance which is limited by a first clearance position and a second clearance position by the brake shoe being displaceable in the direction of the brake disc or the brake drum while maintaining a distance, and that a force can be applied to the brake piston by a restoring device, the restoring device being designed so that the counterforce between the first clearance position and the second clearance position corresponds to a force required for fixing the brake piston.

* * * * *